United States Patent [19]

Thompson

[11] Patent Number: 4,498,507
[45] Date of Patent: Feb. 12, 1985

[54] CABLE TIE

[75] Inventor: Craig D. Thompson, Oakdale, Minn.

[73] Assignee: Minnesota Mining and Manufacturing Company, St. Paul, Minn.

[21] Appl. No.: 508,812

[22] Filed: Jun. 28, 1983

[51] Int. Cl.³ .................. B21F 9/02; B65D 63/14
[52] U.S. Cl. .................. 140/93.2; 24/16 PB; 24/30.5 P
[58] Field of Search ............ 24/16 R, 16 PB, 30.5 R, 24/30.5 P, 30.5 L, 31 F, 115 R, 115 H, 115 K, 115 L, 115 M, 314, 318, 481, 482, 484; 248/74.5; 292/318, 319, 323; 140/93 A, 93.2, 123.6

[56] References Cited

U.S. PATENT DOCUMENTS

| | | | |
|---|---|---|---|
| 1,871,064 | 8/1932 | Kipper et al. | 24/115 H |
| 2,465,132 | 3/1949 | Surface | 24/115 H |
| 2,740,654 | 4/1956 | Orschel | 24/115 R X |
| 3,654,669 | 4/1972 | Fulton | 24/16 PB |
| 3,670,782 | 6/1972 | Kabel | 24/16 PB X |
| 3,744,096 | 7/1973 | Kok | 24/16 PB |
| 3,875,618 | 4/1975 | Schuplin | 24/16 PB |
| 4,422,217 | 12/1983 | Barrette | 24/16 R |

Primary Examiner—William E. Lyddane
Assistant Examiner—James R. Brittain
Attorney, Agent, or Firm—Donald M. Sell; James A. Smith; Terryl K. Qualey

[57] ABSTRACT

A cable tie system for simultaneously assembling and applying cable ties from a continuous length of strap material and a plurality of individual cable tie heads. The cable tie heads are molded of plastic with a pair of parallel cable tie strap passages and a metal pawl retained in the plastic between the two passages and having pawl teeth that project into each of the strap passages to engage the strap material at two spaced positions when it is slid through one of the passages around a bundle of wires and into the second of the passages.

12 Claims, 8 Drawing Figures

CABLE TIE

FIELD OF THE INVENTION

The present invention relates to a cable tie for bundling together electrical wires and the like.

BACKGROUND OF THE INVENTION

Cable ties are in widespread use in bundling together electrical wires to form harnesses in motor vehicles and the like. The majority of cable ties are a one piece construction that is molded of a nylon polyamide plastic such as the cable ties disclosed in U.S. Pat. Nos. 3,542,321 and 3,872,547. These cable ties have a head and a strap extending from the head which is wrapped around a bundle of wires and then inserted through the head whereupon a pawl in the head engages teeth on the strap. The strap is pulled tight around the wire bundle, for example by a tool like that illustrated in U.S. Pat. No. 3,661,187, which cuts off the excess cable strap after tightening the strap around the wire bundle. The engagement of the pawl in the head with the teeth on the strap retains the cable tie in the tensioned condition around the cable bundle. In production it has been found difficult to mold such cable ties so that the engagement between the pawl and the strap reliably provides a sufficiently high force resisting pull out of the strap from the head.

It has long been realized that a much higher resistance to pull out force can be obtained by utilizing a metal pawl in the head to engage the plastic strap, as in the cable tie of U.S. Pat. No. 3,588,961. Production of such ties is, however, more expensive.

With both the all plastic cable ties and the cable ties with a metal pawl of the prior art, the cable tie strap is of a specified length and the excess length of cable strap which is threaded through the head is cut off and thrown away. Typically, several cable ties are produced with varying length straps to accommodate various diameters of wire bundles. While the desirability of using only the needed amount of strap material has been recognized in U.S. Pat. No. 3,353,227, the system of that patent is undesirably complex.

SUMMARY OF THE INVENTION

The present invention provides a cable tie head and a cable tie system utilizing a plurality of the cable tie heads with an elongate plastic cable tie strap material to simultaneously assemble a cable tie and apply it using the appropriate length of cable tie strap material. The cable tie head comprises a rectangular plastic head having a pair of parallel cable tie strap passages therethrough and a metal pawl in the plastic head. The pawl has a planar body extending generally parallel to and lying between the strap passages and at least two pawl teeth at one end of the body. The pawl teeth are bent out of the plane of the body to provide pawl teeth that can simultaneously project one into each of the passages at an angle to the length thereof to engage a cable tie strap at two spaced locations, each of the teeth being bent out of the plane of the body through an angle less than 90°. The pawl body is retained in the plastic head by its end opposite the end having the teeth such that the pawl body is cantilevered and normally positioned with no pawl tooth extending into a first of the cable tie passages. This permits the cable tie strap to be freely slid through the first of the cable tie passages, looped around a bundle of wires and then slid into the second of the passages to engage the pawl tooth therein and deflect the pawl thereby to engage the other pawl tooth with the cable tie strap in the first passage. The strap material may be tensioned around the bundle of wires and then cut off from the supply of cable tie strap material at a point adjacent the head to conserve the cable tie strap material. The metal pawl teeth provide reliable engagement of the plastic strap material under tension.

THE DRAWING

DESCRIPTION OF THE PREFERRED EMBODIMENT

Figure 1:
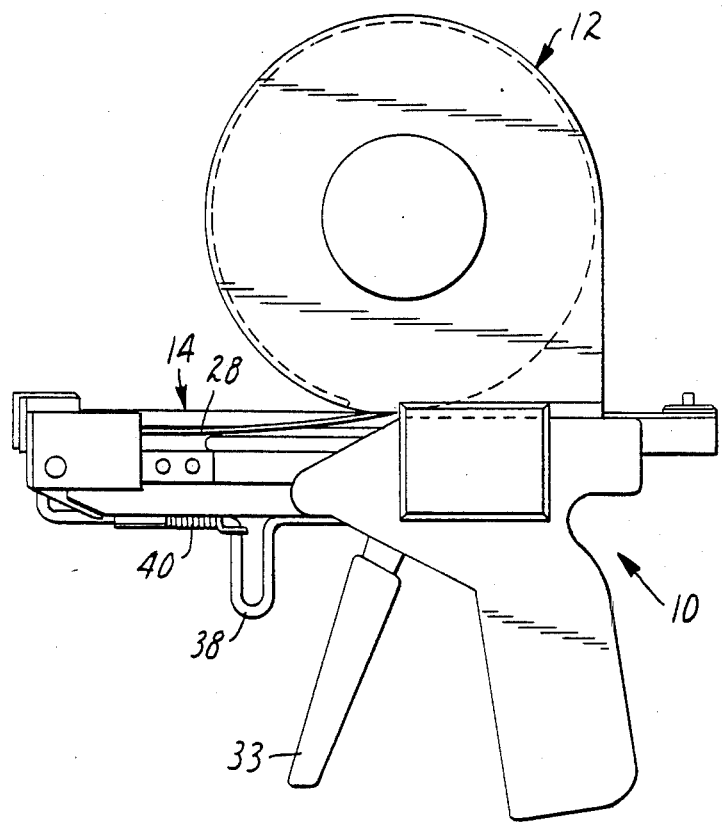
FIG. 1 is a side elevation view of a cable tie system constructed in accordance with the present invention comprising a cable tie tensioning tool supporting a supply of plastic cable tie strap material and a supply of plastic cable tie heads.
Figure 2:
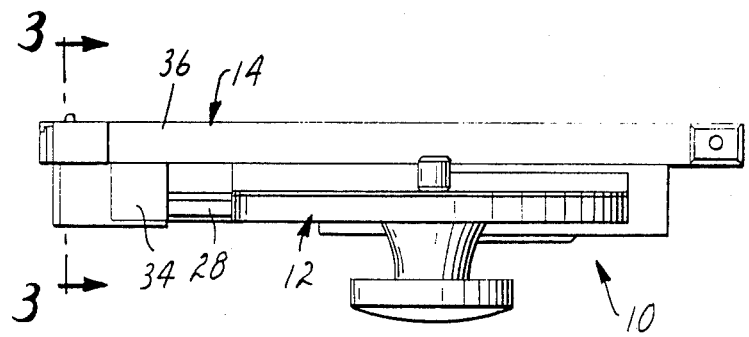
FIG. 2 is a top view of the tool of FIG. 1.

The presently preferred embodiment of the cable tie system of the present invention comprises a cable tie tensioning tool 10 having mounted thereon a cable strap material supply 12 and a cable tie head supply and feed mechanism 14.

Each cable tie head 15 comprises a rectangular plastic head having a pair of parallel cable tie strap passages 17 and 18 therethrough and a metal pawl 20 in the plastic head. The pawl has a planar body 21 extending generally parallel to and lying between the strap passages 17 and 18. The pawl 20 has three teeth 22 and 23 at one end of the body, a central tooth 22 for projecting into the lower passage 17 and two edge teeth 23 for projecting into the upper passage 18. The pawl teeth 22 and 23 are bent out of the plane of the body 21 to provide pawl teeth that can simultaneously project into each of the passages 17 and 18 at an angle to the length thereof to define two spaced locations for engagement of a cable tie strap. Each of the teeth 22 and 23 are bent out of the plane of the body 21 through an angle less than 90° so that all teeth are inclined into the strap passages 17 and 18 progressing in the same direction down the passages.

The pawl 20 is formed with a tab 25 projecting from the end of the body 21 opposite the end on which the teeth are formed. During assembly, the pawl is pushed into a narrow slot 27 in the plastic head until the tab 25 passes through the slot. The plastic on either side of the slot 27 then retains the pawl body 21 in the plastic head by its end opposite the end having the teeth 22 and 23 such that the pawl body 21 is cantilevered and normally positioned with no pawl tooth extending into the first of the cable tie passages 17. This permits the free end of the cable tie strap material 28, having a rectangular cross section like that of the passages 17 and 18 and of slightly lesser dimensions, to be freely slid through the lower passage 17, looped around a bundle of wires 30 and inserted into the upper passage 18. A cable strap stop 31 is provided at the end of the upper passage 18 to stop the end of the cable tie strap material 28 from being pushed through the head 15.

When the free end of the strap material 28 is slid into the upper passage 18 and engages the pawl teeth 23 therein it deflects the pawl 20 to engage the pawl tooth 22 with the cable tie strap material in the lower passage 17. Engagement of the cable tie strap material 28 with the pawl teeth 23 in the upper passage 18 prevents backward movement of the strap material in the upper passage 18. Engagement of the tooth 22 with the strap material in the lower passage 17 prevents further forward movement of the strap material 28 in the lower passage but permits backward movement of the strap material in that passage to tension the strap material around the wire bundle 30. Within the scope of the invention, the pawl may have various alternative configurations including being formed in two back to back pieces with teeth on each of the pieces bent in only one direction out of the plane of the combined body or using a strip with teeth at each end which is folded in the middle to form the pawl.

The presently preferred embodiment of the cable tie system has been constructed using a GS4H cable tie tensioning tool made by Panduit Corporation with offices in Tinley Park, Ill. A similar tensioning tool is illustrated and described in U.S. Pat. No. 3,661,187. The tool 10 operates to tension a cable tie strap around a wire bundle to a predetermined tension and to then cut off the strap material adjacent the cable tie head by squeezing a trigger 33. Squeezing of the trigger causes a gripper 34 to pivot up against the lower surface of the strap material 28 and then to move rearward drawing the strap material backward through the lower passage 17 of the stationary cable tie head 15 and applying tension after the slack has been taken up. When a predetermined tension set on the tool has been reached, a cutting mechanism (not shown) severs the cable strap material 28 between the strap supply 12 and the cable tie head 15 immediately adjacent the head.

Figure 3:
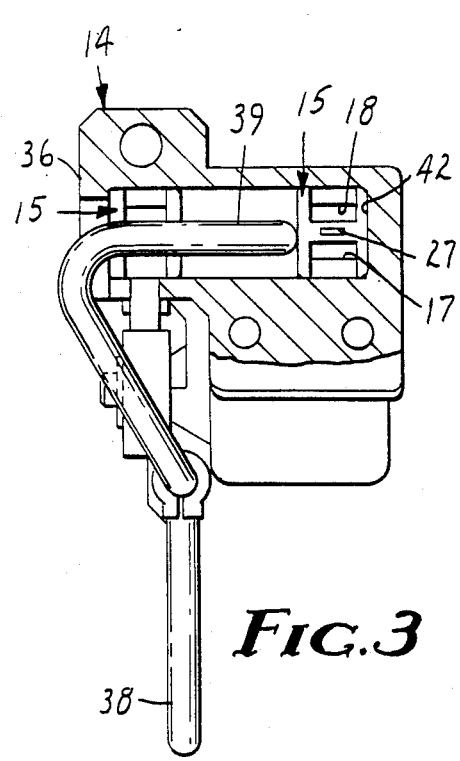
FIG. 3 is a transverse cross sectional view taken along line 3—3 of FIG. 2.
Figure 4:
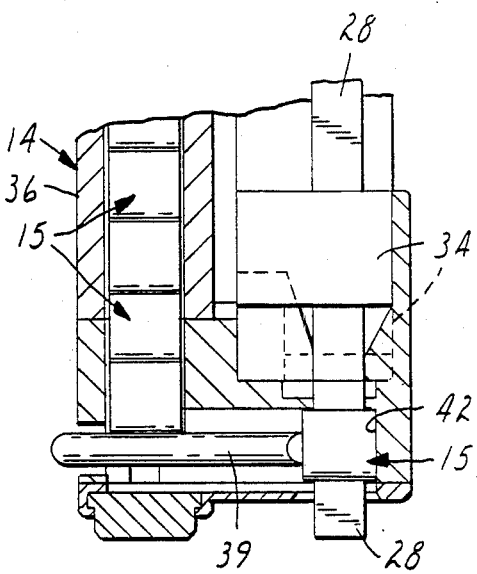
FIG. 4 is a partially sectioned top view of the forward end of the tool.
Figure 5:
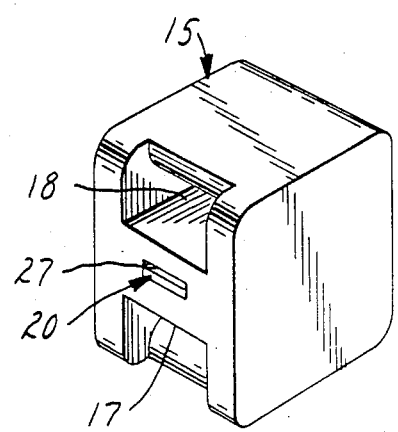
FIG. 5 is a perspective view of a cable tie head constructed in accordance with the present invention.
Figure 6:
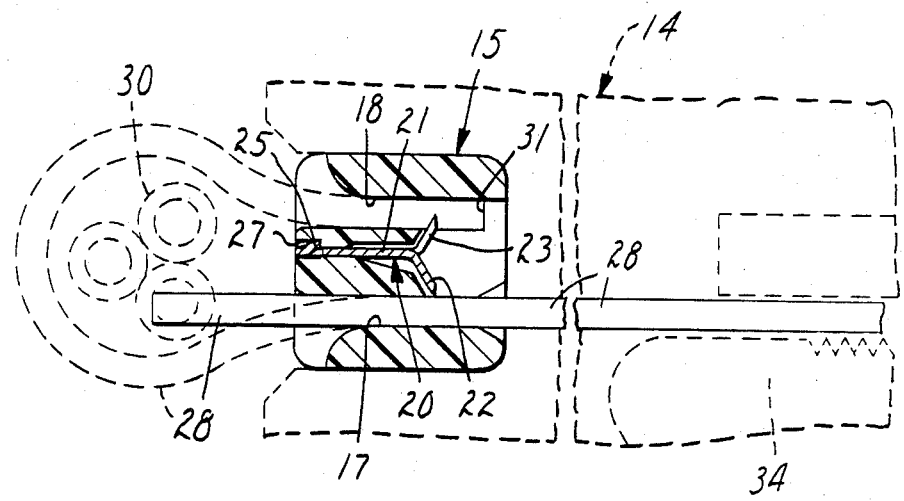
FIG. 6 is a longitudinal cross sectional view of the end of the tool and a cable tie head therein with the end of the cable tie strap material inserted through one of the passages through the head.
Figure 7:
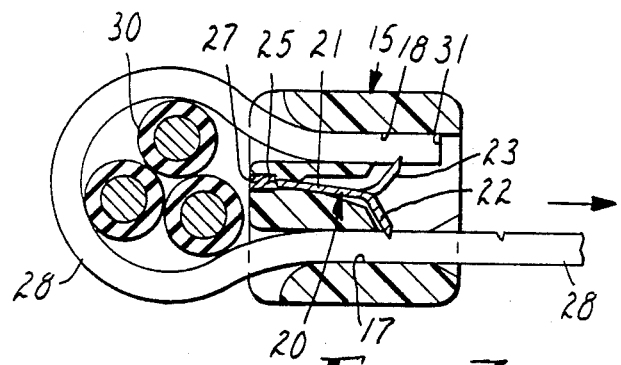
FIG. 7 is a view of a cable tie head similar to that shown in FIG. 6 with the cable tie material looped around a bundle of wires and inserted into the second cable tie passage in the head.
Figure 8:
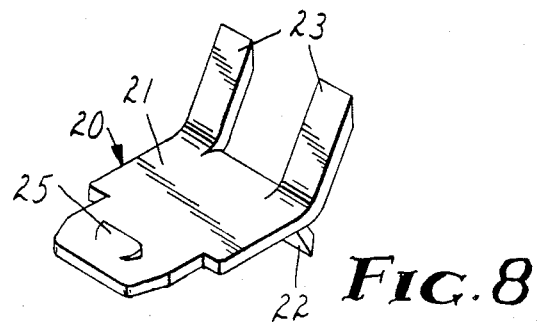
FIG. 8 is a perspective view of the metal pawl used in the cable tie head.

The cable tie head supply and feed mechanism 14 comprises a supply tube 36 which retains a series of cable tie heads in aligned end-to-end relation and which has a spring loaded follower (not shown) urging the cable tie heads 15 toward the front end of the tool 10. The cable tie head feed mechanism consists of a wire form link having a loop 38 projecting beneath the supply tube 36 and a transverse finger 39 extending through an opening in the side of the supply tube 36 at the front end thereof. A torsion spring 40 urges the wire form link to pivot in a clockwise direction as illustrated in FIG. 3 to urge the forwardmost cable tie head 15 from the forward end of the supply tube 36 into an application position 42.

The cable tie strap supply 12 consists of a spool of cable tie strap material 28 within a housing having a peripheral edge wall opening adjacent the tool through which the strap material is withdrawn from the supply. The strap material supply 12 and the cable tie head application position 42 are aligned. The presently preferred plastic material for the strap material 28 and the heads 15 is Nylon 66 and the metal pawl 20 is half hard No. 301 stainless steel.

In use, cable tie heads 15 are placed in the supply 14 and a spool of cable strap material 28 is placed in the strap supply 12. The cable tie head feed loop 38 is pivoted counterclockwise as viewed in FIG. 3 to move the feed finger 39 out of the supply tube 36 permitting the forwardmost cable tie head 15 to be moved forward. Release of the loop 38 permits the torsion spring 40 to pivot the finger 39 back into the supply tube 36 pushing the forwardmost cable tie head 15 into the application position 42. The free end of the supply of cable tie strap material 28 is then inserted through the lower passage 17 through the cable tie head 15, is looped around a bundle of wires 30 and then inserted into the upper passage 18 until it contacts the stop 31. As the strap material 28 is inserted into the upper passage 18 it engages the pawl teeth 23 and deflects the pawl 20 to engage the pawl tooth 22 with the strap material in the lower passage 17.

The trigger 33 of the cable tie tensioning tool 10 is then squeezed to cause the gripper 34 to move rearward pulling the cable tie strap material 28 backward through the lower passage 17 until the strap material 28 is tensioned around the wire bundle 30. When the tension set on the tool is reached the cut off mechanism in the tool severs the cable tie strap material 28 adjacent the head 15. Movement of the tool 10 away from the wire bundle 30 then causes the cable tie head 15, engaging the strap material around the wire bundle 30, to be pulled from the tool 10. The tool is then ready for repetition of the same steps to apply further cable ties.

I claim:

1. A cable tie system comprising:
a tool,
a series of cable tie heads retained in aligned end to end relation in said tool, each said cable tie head comprising:
a rectangular plastic head having a pair of parallel cable tie strap passages therethrough, and
a metal pawl in said plastic head, said pawl having a planar body extending generally parallel to and lying between said strap passages and at least two teeth at one end of said body, said pawl teeth being bent out of the plane of said body to provide pawl teeth that can simultaneously project one into each of said passages at an angle to the length thereof to engage a cable tie strap at two spaced locations, each of said teeth being bent out of the plane of said body through an angle less than 90°, said pawl body being retained in said plastic head by its end opposite the end having said teeth such that said pawl body is cantilevered and normally positioned with no pawl tooth extending into a first of said cable tie passages, and
a spool of cable tie strap material formed and supported on said tool to permit the free end thereof to be slid through said first strap passage in at least one of said cable tie heads from the end thereof adjacent the toothed end of said pawl, looped around a bundle of wires and then threaded back into the second of said passages in said one cable tie head from the end of said body in which said pawl body is retained by said plastic head and past the pawl tooth projecting into said second passage to deflect said pawl and engage the pawl teeth with the strap in both strap passages to prevent backward movement of the strap in said second strap passage and any further forward movement of said strap in said first strap passage.

2. The cable tie system of claim 1 wherein each cable tie head has a cable strap stop at the end of one of said strap passages spaced from and adjacent the end of said pawl having said teeth.

3. The cable tie head of claim 2 wherein said cable strap stop is at the end of said second cable strap passage.

4. The cable tie system of claim 1 wherein said pawl in each said cable tie head has one central tooth for engaging a said strap in one of said strap passages and two edge teeth for engaging the strap in the other of said strap passages.

5. The cable tie system of claim 4 wherein each cable tie head has two edge teeth normally projecting into said second strap passage and said cable tie head has a cable strap stop at the end of said second strap passage spaced from and adjacent the end of said pawl having said teeth.

6. The cable tie system of claim 1 wherein said tool includes means for moving said cable tie heads seriatim out of alignment and into an application position aligned with said spool of cable tie strap material.

7. The cable tie system of claim 6 wherein said tool includes means for pulling the cable tie strap material backward in said one strap passage after the end of said strap material has been inserted into said second strap passage and engaged by the pawl teeth in both strap passages.

8. A cable tie head for use with an elongate plastic cable tie strap to form a cable tie, comprising:

a rectangular plastic head having a pair of parallel cable tie strap passages therethrough, and a metal pawl in said plastic head, said pawl having a planar body extending generally parallel to and lying between said strap passages and at least two pawl teeth at one end of said body, said pawl teeth being bent out of the plane of said body to provide pawl teeth that can simultaneously project one into each of said passages at an angle to the length thereof to engage a said cable tie strap at two spaced locations, each of said teeth being bent out of the plane of said body through an angle less than 90°, said pawl body being retained in said plastic head by its end opposite the end having said teeth such that said pawl body is cantilevered and normally positioned with no pawl tooth extending into a first of said cable tie passages to permit a said cable tie strap to be freely slid therethrough, looped around a bundle of wires and then slid into the second of said passages to engage the pawl tooth therein and deflect said pawl thereby to engage the other pawl tooth with the cable tie strap in said first passage.

9. The cable tie head of claim 8 wherein said cable tie head has a cable strap stop at the end of one of said strap passages spaced from and adjacent the end of said pawl having said teeth.

10. The cable tie head of claim 9 wherein said cable strap stop is at the end of said second cable strap passage.

11. The cable tie head of claim 8 wherein the said pawl has one central tooth for engaging a said strap in one of said strap passages and two edge teeth for engaging the strap in the other of said strap passages.

12. The cable tie head of claim 11 wherein said two edge teeth normally project into said second strap passage and said cable tie head has a cable strap stop at the end of said second strap passage spaced from and adjacent the end of said pawl having said teeth.

* * * * *